US012429214B1

(12) United States Patent
Zheng

(10) Patent No.: US 12,429,214 B1
(45) Date of Patent: Sep. 30, 2025

(54) SPLICED FAN LAMP

(71) Applicant: HANGZHOU JUXING INTELLIGENT TECHNOLOGY CO., LTD., Hangzhou (CN)

(72) Inventor: Hongbing Zheng, Hangzhou (CN)

(73) Assignee: HANGZHOU JUXING INTELLIGENT TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 18/946,369

(22) Filed: Nov. 13, 2024

(30) Foreign Application Priority Data

Oct. 25, 2024 (CN) ........................ 202422601227.3

(51) Int. Cl.

| | |
|---|---|
| ***F21V 33/00*** | (2006.01) |
| ***F21V 15/02*** | (2006.01) |
| ***F21V 17/00*** | (2006.01) |
| ***F21V 21/22*** | (2006.01) |
| ***F21V 21/26*** | (2006.01) |
| ***F21V 21/28*** | (2006.01) |

(52) U.S. Cl.
CPC .......... *F21V 33/0096* (2013.01); *F21V 15/02* (2013.01); *F21V 17/007* (2013.01); *F21V 21/22* (2013.01); *F21V 21/26* (2013.01); *F21V 21/28* (2013.01)

(58) Field of Classification Search
CPC ...... F21V 33/0096; F21V 21/26; F21V 21/28; F21V 21/29; F21V 21/22; F21V 17/007; F21V 15/02
USPC ........................................................... 362/96
See application file for complete search history.

(56) References Cited

U.S. PATENT DOCUMENTS

2008/0192487 A1* 8/2008 Giegerich ................. F21S 2/00 362/352
2010/0316495 A1* 12/2010 Todd, Jr. ............... F04D 25/088 416/5
2012/0287604 A1* 11/2012 Lan ..................... F21V 33/0096 362/96
2013/0114245 A1* 5/2013 Todd, Jr. ............... F04D 25/088 362/96
2017/0045197 A1* 2/2017 Rossi .................... F21V 17/002

FOREIGN PATENT DOCUMENTS

GB 2186813 A * 8/1987 .......... F21V 33/0096

* cited by examiner

*Primary Examiner* — Laura K Tso
(74) *Attorney, Agent, or Firm* — Schwegman Lundberg & Woessner, P.A.

(57) ABSTRACT

A spliced fan lamp, which includes: a chassis, a mounting bracket, a controller, a shell and a net cover. The shell is in a continuous annular ring shape and is assembled and formed by splicing module frames from end to end. The chassis includes a motor, a blowing assembly and a movable arm movably connected to a main body of the chassis, and the chassis and the shell are connected with each other through the movable arm to form a continuous annular ring shape. The entire fan lamp is composed of at least two module frames spliced together, and it is with a single module frame which is not easy to deform, and the chassis consists of at least one movable arm, which is not easy to deform. The fan lamp can be assembled and disassembled in a modular manner, which can simplify and reduce packaging and facilitate transportation.

8 Claims, 6 Drawing Sheets

SPLICED FAN LAMP

CROSS-REFERENCE TO RELATED APPLICATION

This non-provisional application claims priority under 35 U.S.C. § 119(a) on Chinese Patent Application No(s). 202422601227.3 filed on Oct. 25, 2024, the entire contents of which are hereby incorporated by reference.

TECHNICAL FIELD

The disclosure belongs to the technical field of fan lamps, in particular to a spliced fan lamp.

BACKGROUND ART

Generally, metal fan lamps in the market adopt an integrally formed shell, which is very large and easy to deform, exhibits a bloated appearance, and loses a simple appearance of an original fan lamp. Moreover, the integrated metal fan lamp is bulky, with high packaging cost and high transportation cost.

In order to solve above problems, a spliced metal fan lamp is provided in the disclosure, thus solving the problems that a traditional integrated metal lamp is bulky and difficult to package and transport.

SUMMARY

The disclosure aims to provide a spliced fan lamp to solve a problem that the fan lamp is bulky and inconvenient to package, transport and assemble and disassemble in the above background section. A technical scheme is provided as follows. The spliced fan lamp includes:

- a chassis, a side of which is provided with a mounting bracket and in which a controller is built in;
- a shell, which is in a continuous annular ring shape and is assembled and formed by splicing module frames from end to end; and
- a motor, which is provided on the chassis and an end of which is provided with a blowing assembly.

The chassis further includes a movable arm movably connected to a main body of the chassis, and the chassis and the shell are connected with each other through the movable arm to form a continuous annular ring shape. The motor is fixedly arranged at a middle part of the chassis, and a net cover is provided at a bottom of the shell.

The shell is formed by splicing at least two module frames, and an inserting part is respectively provided at side edges of the at least two module frames, and inserting parts are connected and enclosed into the shell with the annular ring shape through end-to-end insertion of the inserting parts.

In this technical scheme, a brushless DC motor is used as the motor, which has advantages of high efficiency and good mute effect, and can effectively reduce noise in operations of a fan. The blowing assembly can be in a form of fan blades or non-fan blades, and the fan blades are made of an ABS material to ensure strength.

The whole fan lamp is composed of at least two module frames spliced together, and compared with an integrally molding mode, it is with a simple manufacturing process, a single module frame which is not easy to deform, and low cost. The chassis and the module frames can be connected with each other by screws.

The frame module is made of metal, and the inserting part is a buckle, and the inserting parts are connected with each other in the annular ring shape through a buckle. By splicing a plurality of module frames, the fan lamp can be assembled and disassembled in a modular manner, which can simplify and reduce packaging and facilitate transportation, and is with simple assembling. Preferably, both the mounting bracket and the chassis are made of metal to ensure their strength and satisfy requirements of loading test and safety.

The net cover at the bottom of the shell ensures that the shell is not easy to deform after mounting and prolongs service life of the fan lamp. The lamp base adopts a base of a bulb lamp, which facilitates bulb selection and replacement, and is with a simple and beautiful appearance.

In any of above technical schemes, further, the movable arm is connected to the chassis through a first connecting component, so that the movable arm can be folded in a direction parallel or perpendicular to a horizontal or vertical plane of the chassis.

The first connecting component at least includes one of a universal joint and a compound hinge. The movable arm is connected to the chassis through a second connecting component, so that the movable arm can telescope along its extension direction so that a distance between a tail end of the movable arm and the chassis can be adjusted, and meanwhile the movable arm can rotate around its own axis.

In the technical scheme, the chassis consists of one or more movable arms, so that a single chassis is not easy to deform and is convenient to assemble. Amounting position of the second connecting component can be at an end of the movable arm or a middle part of the movable arm. The first connecting part can adopt a universal joint or a compound hinge, and the second connecting component can adopt a sleeve structure that can be stretched and rotated.

The universal joint and compound hinge can realize rotation and folding of the movable arm at any angle on the horizontal plane parallel to the chassis; and the sleeve can realize rotation of the movable arm around its own axis. By adopting the first connecting component and the second connecting component, a luminous body can be mounted and adjusted at any angle, thus improving flexibility and convenience of lamp mounting.

In any of the above technical schemes, further, the movable arms are distributed at intervals around a side of the chassis.

The movable arm is further provided with a lamp base for mounting the luminous body, and a terminal wire of the lamp base passes through the mounting bracket and enters the chassis.

The controller is internally fixed at a side of the motor for supplying power to the motor and the lamp base.

In this technical scheme, the luminous body preferably adopts a lamp module controlled by a light source board, and the controller separately control the light source board and the motor to operate. A screw of the motor faces a light emitting surface, and the fan blades are mounted on the screw of the motor. An operator can control light and a rotation speed of the fan through a remote controller.

In this disclosure, a mounting sequence of respective components is as follows: firstly, pre-processed module frames are spliced with each other and fixed in the net cover respectively; the fan blades are inserted into a blade latch of the screw through the screw of the motor, and locked by rotating with a circular cover; a movable bracket and a fixed bracket of the pre-processed chassis are respectively connected with the module frames; and finally, the mounting bracket is fixed to a horizontal ceiling, and then the fan lamp is fixed by side mounting.

The disclosure has advantages that the entire fan lamp is composed of at least two module frames spliced together, and it is with a single module frame which is not easy to deform, and the chassis consists of at least one movable arm, which is not easy to deform. An entire frame of the shell is modular, and is with simple assembling. The bottom of the shell is provided with the net cover, which increases whole rigidity and prolongs service life. The fan lamp can be assembled and disassembled in a modular manner, which can simplify and reduce packaging and facilitate transportation. The lamp base adopts the base of the bulb lamp, which facilitates bulb selection and replacement, and is with a simple and beautiful appearance.

Figure 1:
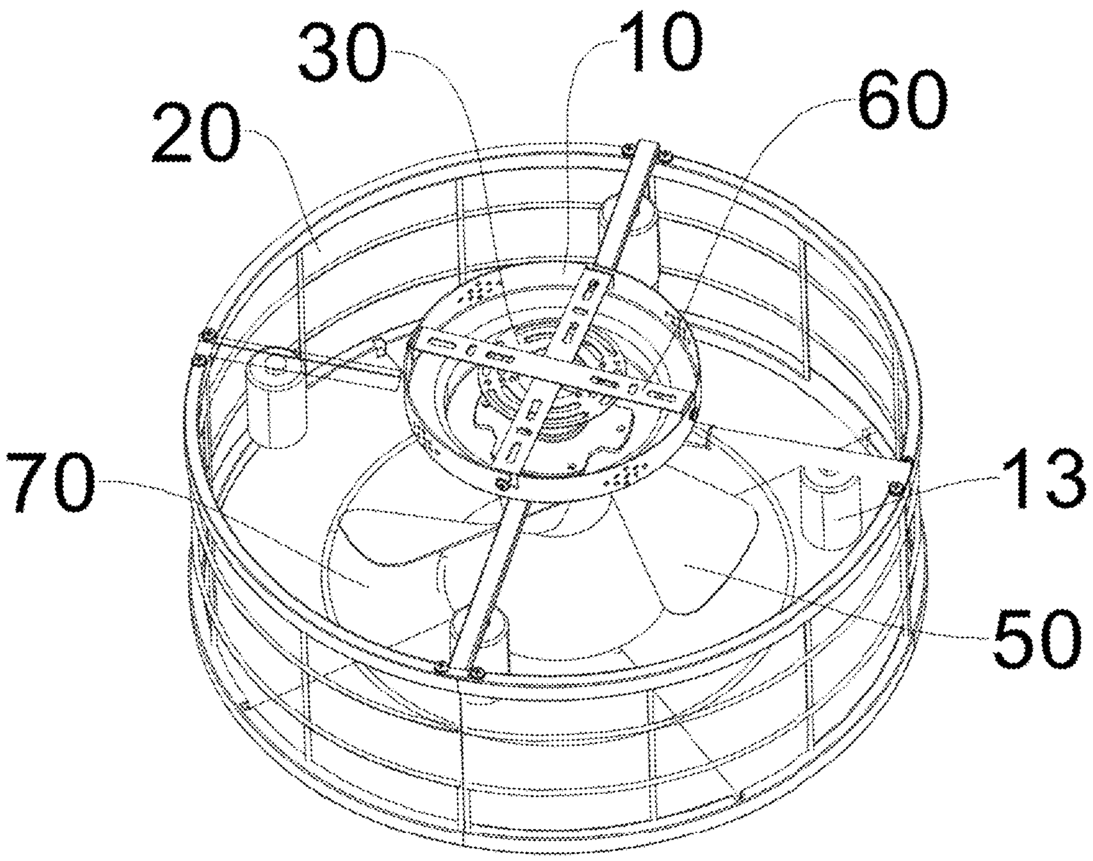
FIG. 1 is a schematic view of an appearance of the disclosure.

Reference numerals in the figures are as follows: 10. Chassis; 11. Movable Arm; 12. First Connecting Component; 13. Lamp Base; 14. Second Connecting Component; 20. Shell; 21. Module Frame; 22. Inserting Part; 30. Motor; 40. Controller; 50. Blowing Assembly; 60. Mounting Bracket; 70. Net Cover.

DETAILED DESCRIPTION

In the following, technical schemes in the embodiments of the disclosure will be described clearly in connection with the drawings; obviously, described embodiments is intended to be only a part of embodiments of the disclosure, but not all of them. On a basis of the embodiments in this disclosure, all other embodiments obtained by the ordinary skilled in the art are within the protection scope of this disclosure.

In description of this disclosure, it should be noted that terminologies used herein is only for describing specific embodiments and is not intended to limit exemplary embodiments according to this disclosure. For convenience of description, dimensions of various parts shown in the drawings are not drawn according to an actual scale relationship. Techniques, methods and devices known to ordinary skilled in relevant art may not be discussed in detail, but in appropriate cases, the techniques, methods and devices should be regarded as a part of the authorized specification. In all examples shown and discussed herein, any specific value should be interpreted to be illustrative only, but not as limitation. Therefore, other examples of exemplary embodiments may have different values. It should be noted that similar reference numbers and letters indicate similar items in the following figures, and thus once an item is defined in one figure, it is not necessary to be further discussed in the following figures.

Embodiment 1

As shown in FIGS. 1 to 4, a spliced fan lamp is provided in this embodiment, which includes:

a chassis 10, a side of which is provided with a mounting bracket 60 and in which a controller is built in;

a shell 20, which is in a continuous annular ring shape and is assembled and formed by splicing module frames 21 from end to end; and a motor 30, which is provided on the chassis 10 and an end of which is provided with a blowing assembly 50.

The chassis 10 further includes a movable arm 11 movably connected to a main body of the chassis 10, and the chassis 10 and the shell 20 are connected with each other through the movable arm 11 to form a continuous annular ring shape. The motor 30 is fixedly arranged at a middle part of the chassis 10, and a net cover 70 is provided at a bottom of the shell 20.

The shell 20 is formed by splicing at least two module frames 21, and an inserting part 22 is respectively provided at side edges of the at least two module frames 21.

In this technical scheme, a brushless DC motor is used as the motor 30, which has advantages of high efficiency and good mute effect, and can effectively reduce noise in operations of a fan. The blowing assembly 50 can be in a form of fan blades or non-fan blades, and the fan blades are made of an ABS material to ensure strength.

The whole fan lamp is composed of at least two module frames 21 spliced together, and compared with an integrally molding mode, it is with a simple manufacturing process, a single module frame 21 which is not easy to deform, and low cost. The chassis 10 and the module frames 21 can be connected with each other by screws.

The frame module 21 is made of metal, and the inserting part is a buckle, and the inserting parts 22 are connected with each other in the annular ring shape through a buckle. By splicing a plurality of module frames 21, the fan lamp can be assembled and disassembled in a modular manner, which can simplify and reduce packaging and facilitate transportation, and is with simple assembling. Preferably, both the mounting bracket and the chassis are made of metal to ensure their strength and satisfy requirements of loading test and safety.

The net cover 70 at the bottom of the shell 20 ensures that the shell 20 is not easy to deform after mounting and prolongs service life of the fan lamp. The lamp base 13 adopts a base of a bulb lamp, which facilitates bulb selection and replacement, and is with a simple and beautiful appearance.

In a preferred embodiment of the disclosure:

As shown in FIG. 2 to 6, specifically, the movable arm 11 is connected to the chassis 10 through a first connecting component 12, so that the movable arm 11 can be folded in a direction parallel or perpendicular to a horizontal or vertical plane of the chassis 10.

The first connecting component 12 at least includes one of a universal joint and a compound hinge. The movable arm 11 is connected to the chassis 10 through a second connecting component 14, so that the movable arm 11 can telescope along its extension direction 11A so that a distance between a tail end 11B of the movable arm 11 and the chassis 10 can be adjusted, and meanwhile the movable arm 11 can rotate around its own axis.

In the technical scheme, the chassis 10 consists of one or more movable arms 11, so that a single chassis 10 is not easy to deform and is convenient to assemble. A mounting position of the second connecting component 14 can be at an end of the movable arm 11 or a middle part of the movable arm. The first connecting part can adopt a universal joint or a compound hinge, and the second connecting component 14 can adopt a sleeve structure that can be stretched and rotated.

The universal joint and compound hinge can realize rotation and folding of the movable arm 11 at any angle on the horizontal plane parallel to the chassis 10; and the sleeve can realize rotation of the movable arm 11 around its own axis. By adopting the first connecting component 12 and the second connecting component 14, a luminous body can be mounted and adjusted at any angle, thus improving flexibility and convenience of lamp mounting.

Figure 2:
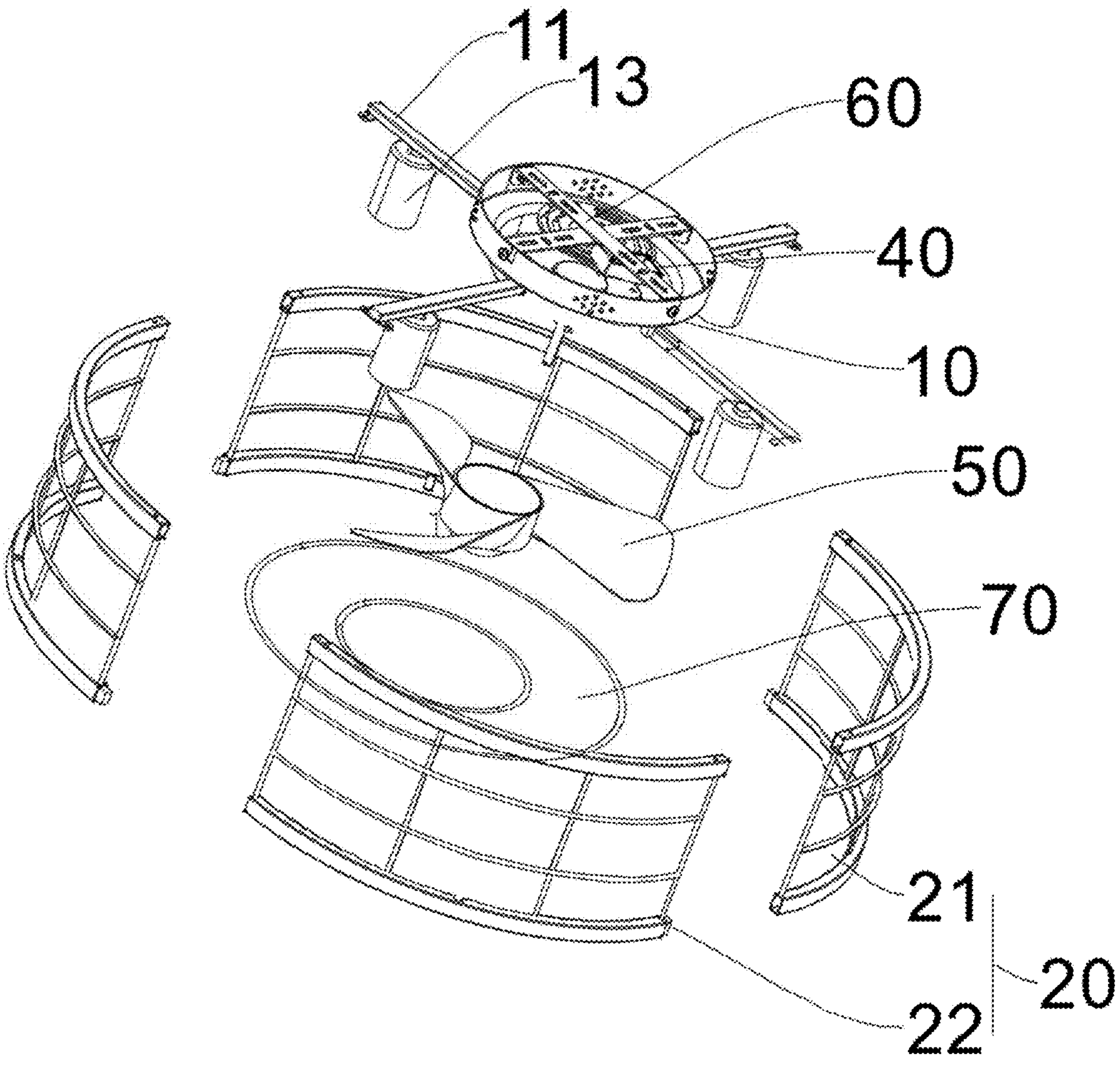
FIG. 2 is an exploded view according to the disclosure.
Figure 3:
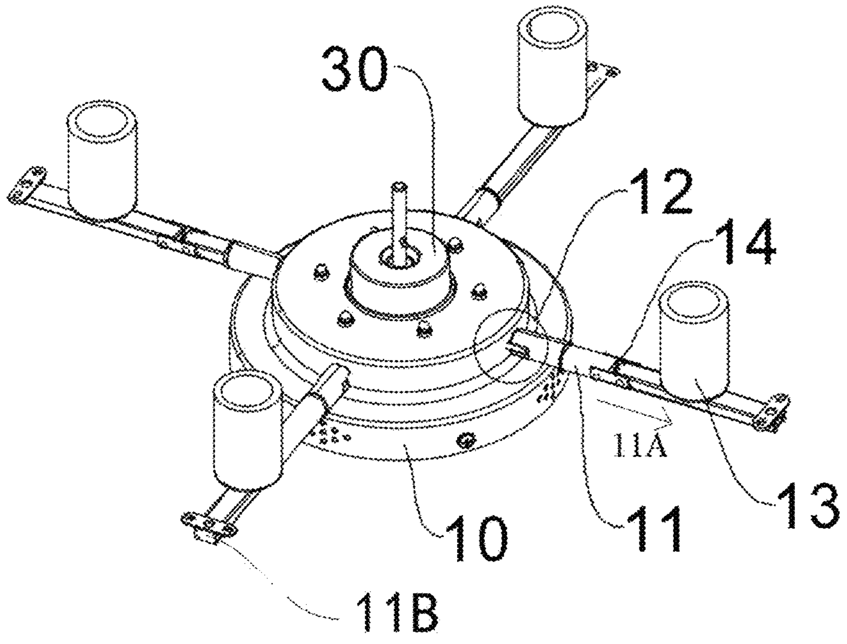
FIG. 3 is a three-dimensional schematic view of a chassis with a movable arm according to the disclosure.
Figure 4:
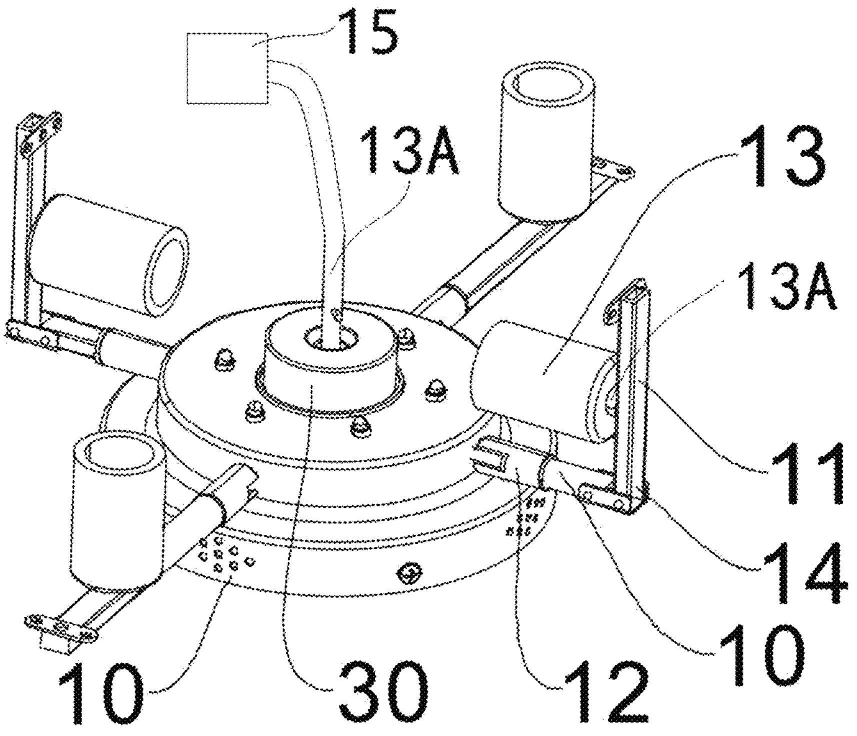
FIG. 4 is a schematic view of a movable arm in a folding state according to the disclosure.
Figure 5:
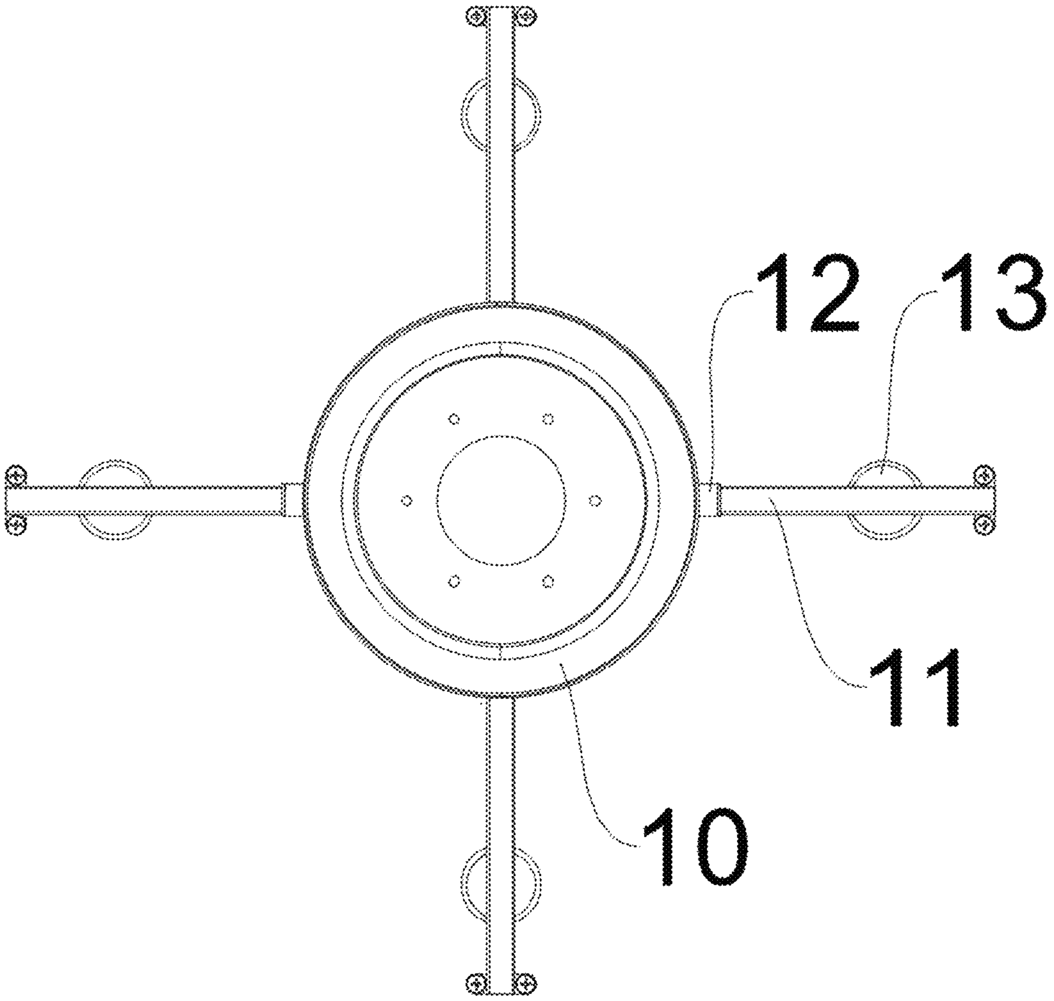
FIG. 5 is a schematic view of a movable arm in an initial state according to the disclosure.
Figure 6:
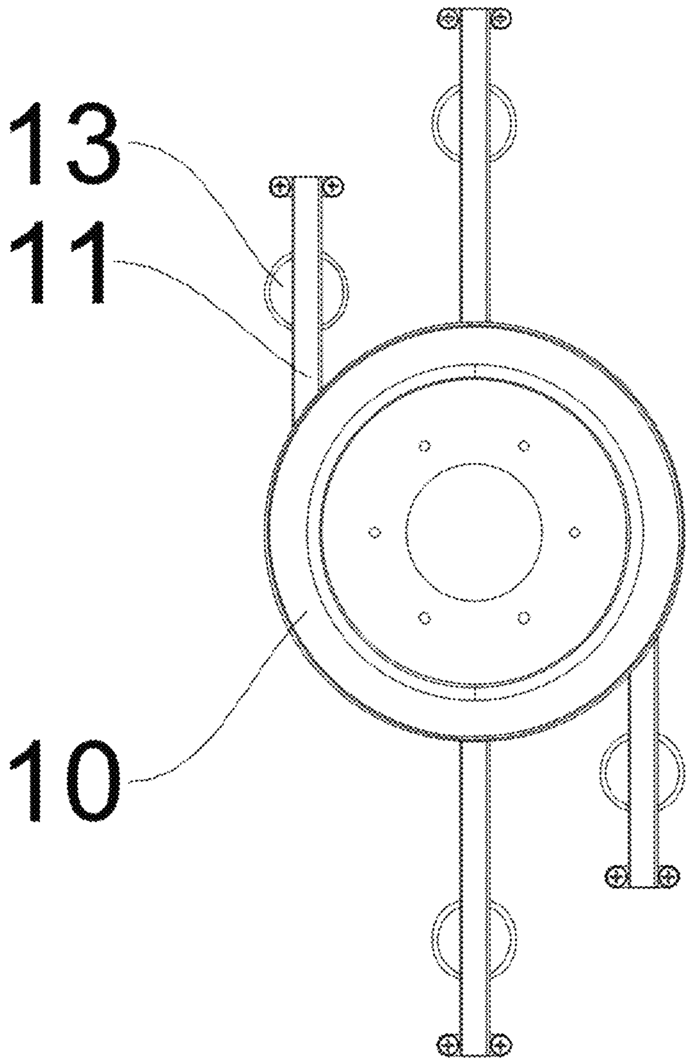
FIG. 6 is a schematic view of a movable arm in a rotating state according to the disclosure.

In a preferred embodiment of the disclosure:

As shown in FIG. 2 to 4, specifically, the movable arms 11 are distributed at intervals around a side of the chassis 10.

The movable arm 11 is further provided with a lamp base 13 for mounting the luminous body, and a terminal wire 13A of the lamp base 13 is connected to a power source 15 and passes through the mounting bracket 60 and enters the chassis 10.

In this technical scheme, the controller 40 is internally fixed at a side of the motor 30 for supplying power to the motor 30 and the lamp base 13. The motor 30 is fixedly arranged at a middle part of the chassis 10.

The luminous body preferably adopts a lamp module controlled by a light source board, and the controller 40 separately control the light source board and the motor 30 to operate. A screw of the motor 30 faces a light emitting surface, and the fan blades are mounted on the screw of the motor. An operator can control light and a rotation speed of the fan through a remote controller. In this disclosure, a mounting sequence of respective components is as follows: firstly, pre-processed module frames 21 are spliced with each other and fixed in the net cover 70 respectively; the fan blades are inserted into a blade latch of the screw through the screw of the motor 30, and locked by rotating with a circular cover; a movable bracket and a fixed bracket of the pre-processed chassis 10 are respectively connected with the module frames 21; and finally, the mounting bracket 60 is fixed to a horizontal ceiling, and then the fan lamp is fixed by side mounting.

Embodiments of this disclosure have been described above in combination with drawings. In case of no conflict, embodiments and features in the embodiments can be combined with each other. This disclosure is not limited to above specific embodiments, which are only schematic but not restrictive. Under inspiration of this disclosure, many forms can be made by ordinary skilled in the art without departing from the spirit of this disclosure and the protection scope of the claims, which all fall within the protection of this disclosure.

What is claimed is:

1. A spliced fan lamp, comprising:

a chassis, a side of which is provided with a mounting bracket and on which a controller is built in;

a shell, which is in a continuous annular ring shape and is assembled and formed by splicing module frames from end to end; and a motor, which is provided on the chassis and an end of which is provided with a blowing assembly; wherein the chassis further comprises a movable arm movably connected to a main body of the chassis, and the chassis and the shell are connected with each other through the movable arm.

2. The spliced fan lamp according to claim 1, wherein the movable arm is connected to the chassis through a first connecting component, so that the movable arm is capable of being folded in a direction parallel or perpendicular to a horizontal or vertical plane of the chassis.

3. The spliced fan lamp according to claim 1, wherein the first connecting component at least comprises one of a universal joint and a compound hinge.

4. The spliced fan lamp according to claim 1, wherein the movable arm is connected to the chassis through a second connecting component, so that the movable arm is capable of telescoping along its extension direction so that a distance between a tail end of the movable arm and the chassis is adjusted; and meanwhile second connecting component is such that the movable arm is capable of rotating around its own axis.

5. The spliced fan lamp according to claim 4, wherein the movable arms are distributed at intervals around a side of the chassis.

6. The spliced fan lamp according to claim 5, wherein the movable arm is further provided with a lamp base for mounting the luminous body, and a terminal wire of the lamp base passes through the mounting bracket to be connected to a power source.

7. The spliced fan lamp according to claim 1, wherein the shell is formed by splicing at least two module frames, and an inserting part is respectively provided at side edges of the at least two module frames, and inserting parts are connected and enclosed into the shell with the annular ring shape through end-to-end insertion of the inserting parts.

8. The spliced fan lamp according to claim 7, wherein a net cover is provided at a bottom of the shell.

* * * * *